UNITED STATES PATENT OFFICE.

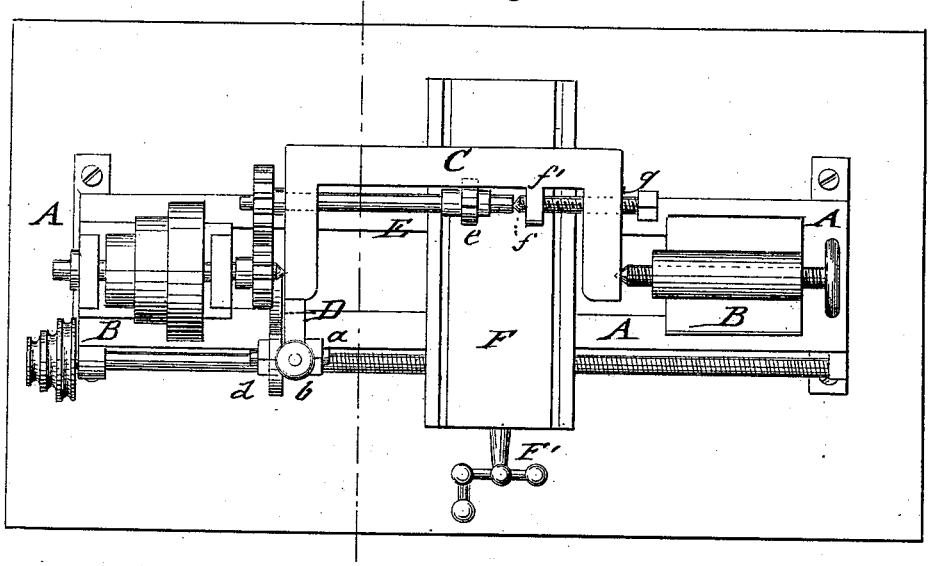

WILLIAM MAIN, JR., OF COLUMBIA, SOUTH CAROLINA.

IMPROVEMENT IN MILLING ATTACHMENTS FOR LATHES.

Specification forming part of Letters Patent No. 181,696, dated August 29, 1876; application filed July 11, 1876.

*To all whom it may concern:*

Be it known that I, WILLIAM MAIN, Jr., of Columbia, in the county of Richland and State of South Carolina, have invented a new and Improved Milling Attachment to Lathes, of which the following is a specification:

In the accompanying drawing, Figure 1 represents a top view of a lathe with my improved milling attachment; and Fig. 2, a vertical transverse section of the same on line $c\,c$, Fig. 1.

Similar letters of reference indicate corresponding parts.

My invention relates to an improved milling attachment for lathes, that may be readily applied to and adjusted on the lathe, so as to add thereby to the effectiveness and usefulness of the same; and the invention consists of a swinging frame that is secured to the lathe-centers, and adjusted along a slotted arc-shaped standard by a clamp and tangent-screw. The swinging frame carries the revolving cutter, to which the work is fed by means of an adjustable bed-plate.

In the drawing, A represents the frame or shears of a lathe of the usual construction, and B the standards carrying the lathe-centers. A swinging frame, C, with rectangular sides, is applied to the lathe-centers, and adjusted by means of a slotted arc-shaped standard, D, which is secured to the lathe-shears by a base part fitted to the lathe, and a clamping arrangement. The standard D is removed from the lathe with the milling attachment when not required for use. The extension of one arm or side of the swinging frame C is firmly clamped to standard D by a set-screw, $a$, and further secured at the required angle by a tangent-screw, $b$, that turns in a socket, $b'$, which is set in the slot of standard D by a clamp-screw, $d$. The tangent-screw $b$ defines the position of the swinging frame and milling-cutter at the exact angle to the work. The swinging frame C carries the revolving arbor E, to which the cutter $e$ is applied, the arbor being retained at one end in a bearing of frame C, at the other by a pointed screw-center, $f$, that passes through the opposite end of a projecting bearing, $f'$, of the frame, the screw-center $f$ being rigidly held in position by a jam-nut, $g$. The cutter-arbor E is revolved by a gear-wheel at the end intermeshing with a gear-wheel of lathe-mandrel.

The work is fed to the milling-cutter by means of a slotted bed-plate, F, and feed-screw F', the bed-plate moving on a guide-plate clamped to the lathe-carriage. The bed-plate F is adjustable to any angle up to an angle of forty-five degrees on the lathe-carriage, and adds thereby to the effectiveness of the milling attachment, while forming also an effective adjunct to the lathe in performing much of its work.

Having thus described my invention, I claim as new and desire to secure by Letters Patent—

The combination of the swinging cutter-carrying frame C, applied to the lathe-centers, with a slotted arc-shaped standard clamped to the lathe, and provided with a clamp-screw and adjusting tangent-screw, substantially in the manner and for the purpose specified.

WILLIAM MAIN, JR.

Witnesses:
WM. C. GROSS,
H. L. FILLEBROWN.